United States Patent

[11] 3,580,153

| [72] | Inventor | Yoshio Fukushima Tokyo, Japan |
| [21] | Appl. No. | 764,507 |
| [22] | Filed | Oct. 2, 1968 |
| [45] | Patented | May 25, 1971 |
| [73] | Assignee | Kabushiki Kaisha Ricoh Tokyo, Japan |
| [32] | Priority | Oct. 11, 1967 |
| [33] | | Japan |
| [31] | | 42/65278 |

[54] APERTURE POSITION SELECTING SYSTEM FOR USE WITH MULTIPHOTOGRAPHIC DEVICE
14 Claims, 11 Drawing Figs.

[52] U.S. Cl. ............................................................ 95/36
[51] Int. Cl. .................................................. G03b 19/02
[50] Field of Search ........................................... 95/36, 12.21; 352/207

[56] References Cited
UNITED STATES PATENTS

| 728,104 | 5/1903 | Himes | 95/36 |
| 1,103,745 | 7/1914 | Farquhar | 95/36 |
| 1,782,860 | 11/1930 | Reipert | 352/207(UX) |
| 2,186,610 | 1/1940 | Leavitt | 95/36 |
| 2,950,644 | 8/1960 | Land | 95/12.21X |
| 3,387,547 | 6/1968 | Houghton | 95/36 |

Primary Examiner—Samuel S. Matthews
Assistant Examiner—Monroe H. Hayes
Attorney—Burgess, Ryan & Hicks ABSTRACT: A multiphotographic device has an objective lens positioned to form a real image which serves as an object for a compound second lens. Immediately behind the objective lens are located a pair of superimposed shield plates movable transversely in orthogonal directions. Each plate is provided with a slot extending perpendicular to its direction of movement; the slots defining a rectangular aperture which admits light to the second lens from the first. Motion of the plates is controlled by a pair of cams. Each cam controls the excursion of a shield plate causing the aperture to advance in steps from a starting position to an extreme position while leaving gaps between the steps, and then back to the starting position in steps during a return movement. The aperture, during the return movement, occupies the gaps.

| FIG. 3A | | | | |
|---|---|---|---|---|
| 1 | 5 | 2 | 4 | 3 |
| 21 | 25 | 22 | 24 | 23 |
| 6 | 10 | 7 | 9 | 8 |
| 16 | 20 | 17 | 19 | 18 |
| 11 | 15 | 12 | 14 | 13 |

| FIG. 3B | | | | | |
|---|---|---|---|---|---|
| 1 | 6 | 2 | 5 | 3 | 4 |
| 31 | 36 | 32 | 35 | 33 | 34 |
| 7 | 12 | 8 | 11 | 9 | 10 |
| 25 | 30 | 26 | 29 | 27 | 28 |
| 13 | 18 | 14 | 17 | 15 | 16 |
| 19 | 24 | 20 | 23 | 21 | 22 |

| FIG. 3C | | | | | | |
|---|---|---|---|---|---|---|
| 1 | 7 | 2 | 6 | 3 | 5 | 4 |
| 43 | 49 | 44 | 48 | 45 | 47 | 46 |
| 8 | 14 | 9 | 13 | 10 | 12 | 11 |
| 36 | 42 | 37 | 41 | 38 | 40 | 39 |
| 15 | 21 | 16 | 20 | 17 | 19 | 18 |
| 29 | 35 | 30 | 34 | 31 | 33 | 32 |
| 22 | 28 | 23 | 27 | 24 | 26 | 25 |

INVENTOR

YOSHIO FUKUSHIMA

BY Burgess, Ryan & Hicks

ATTORNEY

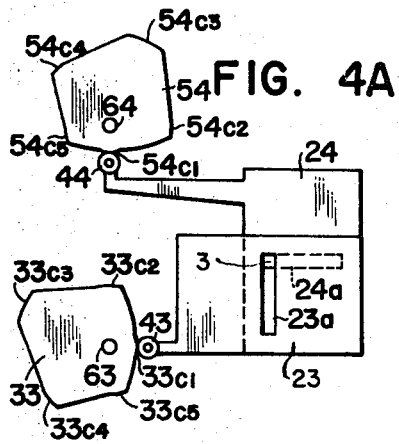
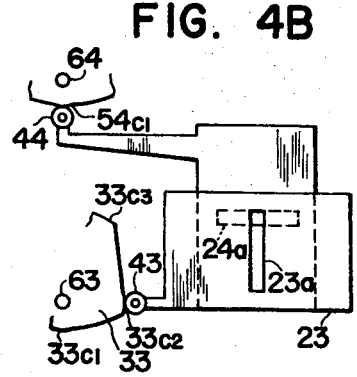
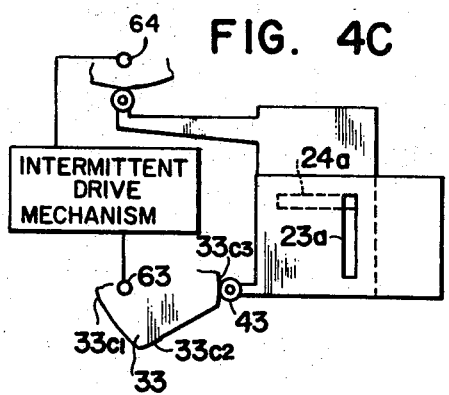
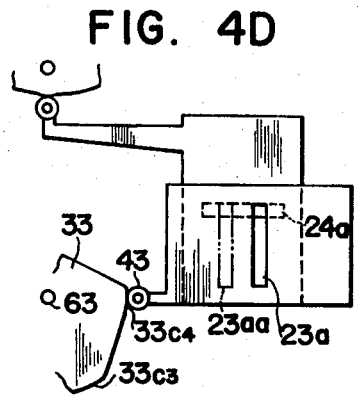
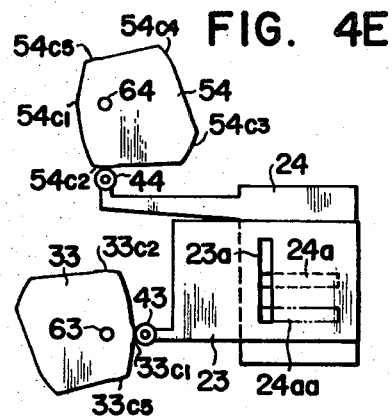
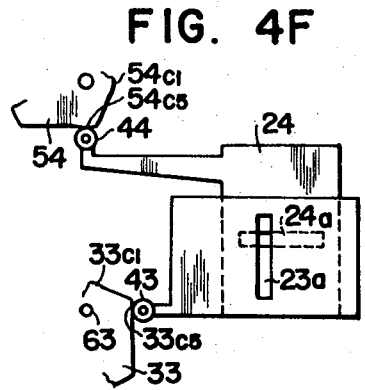

APERTURE POSITION SELECTING SYSTEM FOR USE WITH MULTIPHOTOGRAPHIC DEVICE

BACKGROUND OF THE INVENTION

The present invention relates to an aperture position selecting system for use with multiphotographic device. In such a device a first, or objective, lens forms an image of the scene being photographed. That image in turn serves as an object for a compound second lens comprised of a multitude of microlenses. Each microlens forms an image of a portion of said object on a sheet of photosensitive material placed in the focal plane of the microlenses. An aperture is provided adjacent the first lens, said aperture being movable transversely of the optical axis of the first lens between a plurality of nonoverlapping positions in the path of light through the first lens. The aperture fragments the images projected onto the photosensitive material, and enables different scenes to be photographed during successive photographing steps, the fragmented images thus produced falling on nonoverlapping portions of the photosensitive material.

In a multiphotographic device, the positions of the aperture (which is located in the vicinity of or within a first lens) must be changed for each successive photograph. The sequential selection of the aperture positions greatly influences the multiphotographic operation efficiency and the construction of the aperture position selecting mechanism. It is not desirable that the aperture is displaced to the next adjacent position every time a photograph is made. If the aperture position selecting system is so constructed, then a mechanism for returning the aperture position to its initial or starting position from the last position when a single sheet of sensitive material has been exposed must be provided. A special operation is usually required in order to return the aperture to its starting position from its last position. In order to avoid such cumbersome operation and manipulation, it is preferable that the aperture position be returned to its starting position from the last position by operation of the same mechanism which causes the aperture position to be displaced from one position to another during successive photographing steps with a single piece of film.

SUMMARY OF THE INVENTION

According to the system of the present invention, the aperture may be displaced in both horizontal and vertical directions in a stepwise manner, alternate potential aperture positions being skipped. Thereafter the aperture is sequentially displaced or returned in the opposite direction so as to be located in the positions which have been skipped, whereby the last aperture position is located in the vicinity of the initial aperture position. Therefore, it will be understood that it is preferable that the numbers of the aperture positions in both directions be odd numbers.

The aperture is defined by two elongated slots intersecting at right angles which are provided in first and second movable plates which are adapted to move in the horizontal and vertical directions respectively. These movable plates are adapted to be displaced to predetermined positions by means of cam mechanisms, so that the position of the aperture is determined by the positions of the moving plates.

According to a preferred embodiment of the present invention, in the forward movement of a movable plate the aperture positions are selected with skipped spaces therebetween while in the return movement the aperture positions are so selected as to be located at the positions which have been skipped in the forward movement. The position of the second moving plate is first selected and the first moving plate is then displaced along the whole distance of its travel, the second moving plate being held stationary. Thereafter the second moving plate is displaced and the first moving plate again displaced along the whole distance of its travel. These steps continue until the second moving plate has also been displaced along the whole distance of its travel. Therefore, when the second moving plate has completed its displacement, the exposure of one single sheet sensitive material has been completed. The last aperture position is then located at the position which is adjacent to the initial aperture position.

One of the objects of the present invention is to provide a novel and advantageous aperture position selecting system in which the aperture is displaced from one position to another in the plane perpendicular with respect to the optical axis of the first lens between successive photographs.

According to the present invention, the sequential order of the positions at which the aperture is located during the complete exposure of a sheet of sensitive material is selected so that the operation of the multiphotographic device is facilitated and the aperture driving mechanism does not require special means for returning the aperture position to its initial.

These and other objects and advantages of the present invention will be become apparent in the following description when read in the light of the drawings.

BRIEF DESCRIPTION OF DRAWINGS

FIGS. 3A, 3B, and 3C are explanatory views illustrating the order of displacement of the aperture selected by the system according to the present invention; and FIGS. 4A to 4F are rear views of the aperture positioning device adapted to displace the aperture according to the system of the present invention.

DESCRIPTION OF THE PREFERRED EMBODIMENT

Figure 1:
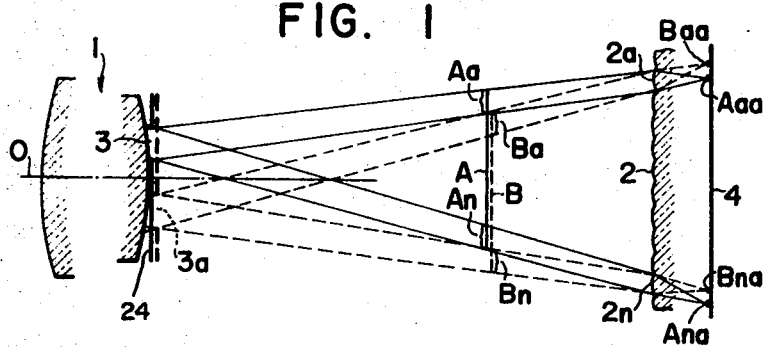
FIG. 1 is an explanatory view illustrating the optical system of a multiphotographic device according to the present invention.

The optical system of the multiphotographic device is comprised of a relatively large diameter first lens 1, a second lens 2 and an aperture disposed immediately behind the first lens 1 as shown in FIG. 1. The second lens 2 is a compound lens comprised of a group of microlenses which are arrayed in rows and columns. These microlenses split the inverted image produced by the first lens 1 into finely divided portions which in turn are focused upon a sensitive material 4 as erect images. The aperture 3 is arranged and disposed so as to be movable vertically and transversely within a plane perpendicular with respect to the optical axis O of the first lens 1. The aperture 3 serves to determine where the finely split images are focused upon the sensitive material 4 through the microlens elements of the second lens 2. The same effect can be attained even if the aperture 3 is disposed immediately in front of the first lens 1 or within the first lens 1. As to the sensitive material 4 shown as being disposed behind of the second lens 2 in this embodiment, the sensitive material may be disposed at any plane as long as said plane is the focusing plane of the second lens 2. For example, the sensitive material may be disposed immediately upon the rear surface of the second lens 2 or in spaced-apart relation therewith by a suitable distance.

Let it be assumed that one inverted image A of an object is formed by the first lens 1 between the first and second lenses 1 and 2. Then one portion $Aa$ of the image A included in the light ray incident upon one microlens element $2a$ of the second lens 2 through the aperture 3 is focused upon the sensitive material 4 as an erect split image $Aaa$. In the similar manner as described above, another portion $An$ of the image A included in the light ray incident upon another microlens element $2n$ of the second lens 2 through the aperture 3 is focused upon the sensitive material 4 as an erect split image $Ana$.

Next the aperture 3 is displaced to the position indicated by $3a$, and the first lens is directed to another object to be photographed. Then, the image B thereof is produced. One portion $Ba$ of the image B included in the light ray incident upon the microlens element $2a$ through the aperture $3a$ is focused upon the sensitive material as an erect split image B*aa*. In the similar manner, another portion B*n* of the image B included in the light ray incident upon the microlens element 2*n* through the aperture 3*a* is focused upon the sensitive material 4 as an erect split image B*na*.

When the aperture is displaced to the position intermediate the positions indicated by 3 and 3*a*, the finely split images of the image produced through the first lens are focused upon the unexposed portion of the sensitive material 4, that is the portions intermediate the portions exposed by the split images of the images A and B respectively as described above. In this case, it is of course required that the new position of the aperture when displaced from the preceding position should not be overlapped with this preceding position. The finely split images of the complete image produced through the first lens 1 are thus distributed over the substantially whole surface of the sensitive material, and are prevented from being overlapped one upon another.

The number of pictures to be photographed by the multiphotographic device of the type described hereinbefore is determined by the ratio of the exposure area when the shield plate carrying the aperture is removed to the exposure area when the aperture is provided. In other words, the number of pictures to be photographed is dependent upon the ratio of the effective area of the first lens when located at the position of the aperture to the aperture area of the aperture. For example, let it be assumed that the effective diameter of the first lens at the position of the aperture is 30 mm.; the distance between the aperture and an image produced by the first lens is 80 mm.; the distance between said image and the second lens is 40 mm.; the aperture has the dimensions of 2 mm.×2 mm.; the displacement pitch of the aperture both in the vertical and transverse directions is 3 mm.; and the aperture is movable in seven steps in both the vertical and transverse directions; then the 49 pictures can be photographed upon a single sensitive material.

In the multiphotographic device, the images of the objects are recorded upon the sensitive material as finely split images distributed thereupon so that it is impossible to see what objects are recorded upon the sensitive material simply by inspecting it. These images can only be reproduced by utilizing an optical system similar to that used in exposing the sensitive material in which the illumination or projecting light source is disposed behind the sensitive material and the light rays from the light source proceed in the opposite direction to that of the light rays when photographed.

Figure 2:
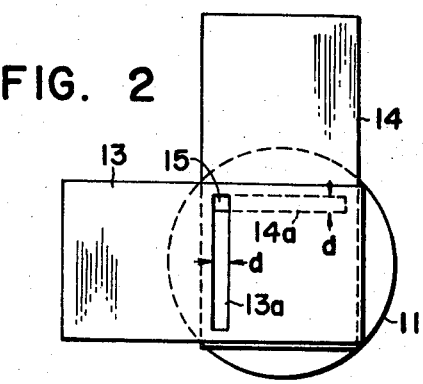
FIG. 2 is a rear view of a pair of movable plates adapted to define an aperture which may be displaced from one position to another behind the first photographic lens.

Now reference is made to FIG. 2, wherein reference numeral 11 designates a first lens; 13, a first moving plate slidable in the horizontal direction and having an elongated slot 13*a* whose width is equal to the length of one side of a square aperture; and 14, a second moving plate slidable in the vertical direction and having an elongated slot 14*a* which is adapted to define a square aperture 15, when intersected with the elongated slot 13*a* described above. Let it be assumed again that the width of the elongated slot 13*a* or 14*a* is *d*, then the position of the aperture 15 may be displaced stepwise by moving both of the moving plates 13 and 14 by a distance of *d*. However, it should be noted here that in practice the displacement of the moving plate in one step is slightly larger than the width *d* so that the minute gaps or spaces are formed between the adjacent positions.

When the moving plates 13 and 14 are displaced in five steps respectively, a total number of 25 are formed as shown in FIG. 3A; and, in a similar manner, when the moving plates 13 and 14 are displaced in six and seven steps respectively, then 36 and 36 apertures may be formed as shown in FIGS. 3B and 3C respectively. The numerals in the square frames in FIGS. 3A, B and C indicate the successive photographing steps of the aperture during successive photographing steps.

Considering FIG. 2 and FIG. 3C, the second elongated slot 14*a* is held stationary while the first elongated slot 13*a* is displaced to the right in the FIG. two positions at a time so that the aperture positions are selected in the order of (1), (2), (3) and (4). On the other hand, when the first elongated slot 13*a* is returned in the opposite direction, that is to the left in the FIG., the aperture positions are selected in the order of (5), (6) and (7), filling in the gaps between the previously occupied aperture positions. Thus seven apertures are formed in one row. In this case, an exposure is made in each aperture position, so that seven photographs are made while the first elongated slot 13*a* makes one complete reciprocal movement as described above. When the seventh exposure has been completed, that is when the first elongated slot 13*a* has completed its one reciprocal movement in the horizontal direction, the second elongated slot 14*a* is displaced downwardly by two steps and the first elongated slot to its leftmost position. Then the first elongated slot 13*a* is made to reciprocate in the same manner as described above, successively occupying positions (8), (9), (10), (11), (12), (13), and (14). In the quite similar manner as described above, whenever the first elongated slot has completed one horizontal reciprocal movement, the second elongated slot 14*a* is displaced by two steps downwardly. On the other hand, in the returning stroke or displacement of the second elongated slot 14*a* in the upward direction, the second elongated slot 14*a* is displaced upwardly by one step from the lowest in one row to the second lowest, and then upwardly by two steps to the fourth and second rows. Thus, it is clear that the apertures are selected in the final row in the order of (43), (44), (45), . . . and (49) as the first elongated slot 13*a* makes one reciprocal movement in the horizontal direction along the second elongated slot 14*a* which is now held stationary in the second row. The last aperture position designated by 49 at which the last photographing is made is so selected as to be located adjacent to the first photographing aperture position (designated as 1), so that the aperture can be returned to its initial position by displacing both of the first and second elongated slots 13*a* and 14*a* by one step.

FIGS. 4A to 4F illustrates the steps of the actuation of one embodiment of the aperture selecting device according to the present invention in which a first elongated slot 23*a* and second elongated slot 24*a* are displaced in five steps respectively so as to select the apertures in the sequence as shown in and described with reference to FIG. 3A. A roller 43 of the first moving plate 23 is pressed against a first plate cam 33 by a spring (not shown) biasing the first moving plate 23 to the left. The first plate cam 33 is provided with cam contour portions 33*c*1, 33*c*2, 33*c*3, 33*c*4 and 33*c*5 each of which is an arc of a circle concentric with shaft 63. A complete rotation of the shaft 63 displaces the first moving plate 23 in five horizontal steps. A second plate cam 54 against which is pressed a roller 44 of the second moving plate 24 has a contour similar to that of the first plate cam 33, thus having cam contours 54*c*1, 54*c*2, 54*c*3, 54*c*4 and 54*c*5 each of which is an arc of a circle concentric with a shaft 64.

When the first plate cam 33 is rotated about the shaft 63 in the clockwise direction (while the second plate cam 54 is held stationary) so that the roller 43 is pressed against the cam contour periphery 33*c*2, the first elongated slot 23*a* is first caused to move to the right by two steps shown in FIG. 4B. This moves the aperture from position 1 of FIG. 3A to position 2 thereof. After completion of the second exposure with the first elongated slot 32*a* in this position, the first plate cam 33 is further rotated in the same direction so that the roller 43 comes into contact with the cam periphery 33*c*3. As a result, the first elongated slot 23*a* is further displaced to the right by two steps so that the first elongated slot 23*a* is positioned at the rightmost aperture position of the second elongated slot 24*a* as shown in FIG. 4C. This moves the aperture to position 3 of FIG. 3A. FIG. 4D illustrates the state in which the first elongated slot 23*a* has returned to the left by one step from the position shown in FIG. 4C because the roller 43 is in contact with the cam periphery 33*c*4. This moves the aperture to position 4 of FIG. 3A. When the first plate cam 33 is further rotated from the state shown in FIG. 4D so that the roller 33 comes to contact with the cam periphery 33*c*5, then the first elongated slot 23a is caused to return to the position indicated by the two-dots chain line 23aa (position 5 of FIG. 3A). FIG. 4E illustrates the state in which the first plate cam 33 has completed its one rotation so that the first elongated slot 23a has completed one horizontal reciprocal movement and at the same time the second plate cam 54 has rotated about the shaft 64 in the clockwise direction so that the roller 44 of the moving plate 24 is pressed against the cam periphery 54c2, whereby the second elongated slot 24a is displaced downwardly by two steps. In order to ensure the stepwise rotation of the second cam plate 54 whenever the first cam plate 33 has completed its one rotation, the first and second cam plates are operatively interconnected by means of a suitable intermittent driving mechanism. A further one rotation of the cam plate 54 from the state shown in FIG. 4E causes the second elongated slot 24a to move to the lowermost aperture forming position designated by the two-dot line 24aa, whereby the 11th exposure is made (See FIG. 3A). FIG. 4F illustrates the state in which when both of the elongated slots 23a and 24a require only one remaining step to the left and upward for the aperture is to be returned to its initial position. That is, FIG. 4F shows the aperture position as the last exposure is made.

The cams which rotate in one direction in a precisely controlled relationship with respect to each other control the moving plates respectively from the time when the aperture is positioned in its initial position shown in FIG. 4A to the time when the aperture is positioned its last position shown in FIG. 4F in the predetermined order of the sequence. Since each of the cam peripheries of the cam plate is formed by an arc of a circle, the aperture positions are not incorrect even if the angle of rotation of the plate cam is deviated, as long as the contact of the roller 43 is within the range of the central angle including the arc periphery of the cam plate.

According to the system according to the invention in which one elongated slot is caused to make one reciprocal movement while the other makes a plurality of reciprocal movements in order to select the aperture positions, the last photographing aperture position can be located adjacent to the initial photographing aperture position, so that it is not necessary to return the last photographing aperture position to its initial photographing position by a special manipulation or any other means or mechanism for returning the aperture to its initial position.

The present invention has been described in detail with particular reference to a preferred embodiment thereof, but it will be understood that variations and modifications can be effected within the spirit and scope of the present invention as described hereinabove and as defined in the appended claims.

The word "adjacent," as used in the appended claims to describe the position of the movable shield plates 23 and 24 relative to the objective lens 1 is meant to describe the situation where the plates are disposed between elements of said lens, as well as where they are disposed ahead of or behind the lens.

I claim:

1. A multiphotographic device comprising a lens, an aperture movable in a plane which is vertical to the optical axis, and behind the aperture an array of microlenses positioned to focus on sensitive material behind the microlenses a plurality of partial pictures, the aperture being defined by the intersection of two slots in two plates which are movable relative to each other, the slot in each plate extending transverse to the direction of movement of said plate, and driving means for moving the slot of one plate over the length of the slot of the other plate during each cycle of exposure so that the plates are movable stepwise in a direction perpendicular to each other, the slot of the other plate being reciprocated in each position of the first plate over the length of the slot of the first plate, the plates during the outward movement in one direction skip each second possible position of their slot and on their return movement omit the position on which the slots have been during the outward movement, the end position of the slot of each plate being adjacent the beginning position of the slot.

2. In a multiphotographic device having an objective lens with an optical axis and a compound lens comprised of a plurality of microlenses positioned behind the objective lens on the optical axis, the improvement comprising:
a lightproof shield occluding the pathway of light from the object being photographed through the objective lens to the compound lens, said shield comprising
a first shield plate movable along a first path transverse to the optical axis in an outward movement and a return movement,
a second shield plate movable along a second path transverse to the optical axis and to the first path in an outward movement and a return movement,
a first slot in the first shield plate, said first slot extending transverse to the first path, and
a second slot in the second shield plate, said second slot extending transverse to the second path and overlapping the first slot, said first and second slots extending transversely to each other and defining an aperture through the shield plates, said aperture affording a passage for light from the object being photographed to the compound lens;
means for successively moving the first shield plate to a plurality of photographing positions during the outward movement, said positions being separated by first gaps;
means for successively moving the first shield plate to a plurality of photographing positions during the return movement, said positions being located in said first gaps;
means for successively moving the second shield plate to a plurality of photographing positions during the outward movement, said positions being separated by second gaps;
means for successively moving the second shield plate to a plurality of photographing positions during the return movement, said positions being located in said second gaps; and
the first and second shield plates defining, when each is in a photographing position, a photographing aperture, said photographing aperture varying in position when a shield plate is moved from one photographing position to another, and the various positions of the photographing aperture being in nonoverlapping relation.

3. The device of claim 2 wherein the shield plates are disposed immediately behind the objective lens.

4. The device of claim 2 wherein the first and second paths are substantially perpendicular and the first and second slots are substantially perpendicular to the first and second paths, respectively.

5. The device of claim 4 wherein:
the means for successively moving the first shield plate comprises
a first cam follower movable with the first shield plate, and
a first cam rotatable about a first cam axis in driving relation with the first cam follower, said first cam having a number of contact surfaces positioned equiangularly around the first cam axis, each said contact surface being the arc of a circle having a center at the first cam axis;
the means for successively moving the second shield plate comprises
a second cam follower movable with the second shield plate, and
a second cam rotatable about a second cam axis in driving relation with the second cam follower, said second cam having a number of contact surfaces positioned equiangularly around the second cam axis, each said contact surface being the arc of a circle having a center at the second cam axis; and
the shield plates are disposed in close proximity to the objective lens.

6. The device of claim 5 comprising intermittent drive means for rotating the second cam a distance sufficient to move the second shield plate from one photographing position to another upon each complete revolution of the first cam.

7. The device of claim 2 wherein the means for successively moving the first shield plate comprises a first cam and a first cam follower connected to the shield plate.

8. The device of claim 7 wherein the means for successively moving the second shield plate comprises a second cam and a second cam follower connected to the second shield plate.

9. The device of claim 7 wherein the first cam is rotatable about a first axis.

10. The device of claim 9 wherein the second cam is rotatable about a second cam axis.

11. The device of claim 9 wherein the first and second cams have cam contours which are arcs of circles centered at the cam axes and which contact the cam followers when the shield plates are in photographing positions.

12. The device of claim 11 comprising intermittent drive means for rotating the second cam a distance sufficient to move the second shield plate from one photographing position to another upon each complete revolution of the first cam.

13. A method of positioning an exposure aperture for successive exposures in an optical device having an objective lens, a compound lens comprised of a plurality of microlenses, and a lightproof shield adjacent the objective lens, said shield being movable and having an aperture therethrough, said method comprising:

moving the shield in an outward movement to position the aperture successively at spaced intervals separated by gaps along a first row of aperture positions;

moving the shield in a return movement to position the aperture successively at spaced intervals along the first row of aperture positions, the aperture being positioned during the return movement in the gaps in the first row left during the outward movement;

moving the shield in an outward movement to position the aperture successively at spaced intervals separated by gaps along a second row of aperture positions, said second row being separated from the first row by a gap;

moving the shield in a return movement to position the aperture successively at spaced intervals separated by gaps along a second row of aperture positions, said second row being separated along the second row of aperture positions, the aperture being positioned during the return movement in the gaps in the second row left during the outward movement;

moving the shield in an outward movement to position the aperture successively at spaced intervals separated by gaps along a third row of aperture positions, said third row being in the gap between the first and second rows of aperture positions;

moving the shield in a return movement to position the aperture successively at spaced intervals along the third row of aperture positions, the aperture being positioned during the return movement in the gaps in the third row left during the outward movement; and locating all the aperture positions so that none of said positions overlap.

14. A method of positioning an exposure aperture for successive exposures in an optical device having an objective lens with an optical axis, a compound lens comprised of a plurality of microlenses, and a lightproof shield adjacent the objective lens, said shield being comprised of a first shield plate movable along a first path transverse to the optical axis in an outward movement and a return movement, and a second shield plate movable along a second path transverse to the optical axis and to the first path in an outward movement and a return movement, said first shield plate having a first slot extending transverse to the first path and said second shield plate having a second slot extending transverse to the second path and also transverse to the first slot, whereby said slots define an exposure aperture through the shield at their crossing, said method comprising:

a. positioning the second shield plate in a first position;
b. moving the first shield plate in the outward movement successively to a plurality of exposure positions separated by gaps without moving the second shield plate;
c. moving the first shield plate in the return movement successively to a plurality of exposure positions in the gaps without moving the second shield plate; d. moving the second shield plate in the outward movement to a second position separated from the first position by a gap and repeating steps (a) and (b) above;
e. moving the second shield plate in the return movement to a third position in the gap between the first position and the second position, and repeating steps (a) and (b) above; and
f. insuring that the exposure positions defined by the first and second shield plates are nonoverlapping.